(12) United States Patent
Murray et al.

(10) Patent No.: US 9,031,110 B2
(45) Date of Patent: May 12, 2015

(54) LASER OPTIC PROTECTION

(71) Applicant: Synrad, Inc., Mukilteo, WA (US)

(72) Inventors: Michael W. Murray, Mukilteo, WA (US); Melvin J. Lima, Bothell, WA (US)

(73) Assignee: Synrad, Inc., Mukilteo, WA (US)

( * ) Notice: Subject to any disclaimer, the term of this patent is extended or adjusted under 35 U.S.C. 154(b) by 91 days.

(21) Appl. No.: 13/838,128

(22) Filed: Mar. 15, 2013

(65) Prior Publication Data

US 2014/0269794 A1    Sep. 18, 2014

(51) Int. Cl.
| | |
|---|---|
| *H01S 3/00* | (2006.01) |
| *G02B 7/00* | (2006.01) |
| *H01S 3/02* | (2006.01) |
| *H01S 3/034* | (2006.01) |
| *G02B 27/00* | (2006.01) |

(52) U.S. Cl.
CPC .............. *H01S 3/0014* (2013.01); *G02B 7/007* (2013.01); *H01S 3/027* (2013.01); *H01S 3/0346* (2013.01); *G02B 27/0006* (2013.01)

(58) Field of Classification Search
CPC ..... H01S 3/0346; H01S 3/027; H01S 3/0014; G02B 27/0006
See application file for complete search history.

(56) References Cited

U.S. PATENT DOCUMENTS

| | | | |
|---|---|---|---|
| 4,439,862 A | | 3/1984 | Mohler |
| 4,575,610 A | * | 3/1986 | Gavin ........................ 219/121.6 |
| 5,359,176 A | | 10/1994 | Balliet, Jr. et al. |
| 5,898,522 A | | 4/1999 | Herpst |
| 6,240,110 B1 | * | 5/2001 | Ershov ............................ 372/20 |
| 2008/0112447 A1 | * | 5/2008 | Wilhelmi et al. .......... 372/38.09 |

FOREIGN PATENT DOCUMENTS

| | | |
|---|---|---|
| JP | S60-123080 A | 7/1985 |
| JP | H01-218081 A | 8/1989 |
| WO | 9713172 A1 | 4/1997 |

OTHER PUBLICATIONS

International Search Report issued in corresponding International Application No. PCT/JP2014/030315 dated Aug. 25, 2014 (4 pages).
Written Opinion of the International Searching Authority issued in PCT/US2014/030315 dated Aug. 25, 2014 (9 pages).
Jens Schwarz et al: "Debris mitigation techniques for petawatt-class lasers in high debris environments", Physical Review Special Topic—Accelerators and Beams, vol. 13, No. 4, Apr. 1, 2010 (7 pages).

* cited by examiner

*Primary Examiner* — Julio J Maldonado
*Assistant Examiner* — Joshua King
(74) *Attorney, Agent, or Firm* — Osha Liang LLP

(57) ABSTRACT

The specification and drawings present an apparatus and a method for protecting lasers or other sources of high optical power from damage due to external sources of contamination using a concept of a sacrificial optical component and automatic laser shutdown based on a pressure indication of a substantial damage to the sacrificial optical component such as puncturing through that component.

27 Claims, 6 Drawing Sheets

LASER OPTIC PROTECTION

TECHNICAL FIELD

The exemplary and non-limiting embodiments relate generally to laser optics and more specifically to protecting lasers or other sources of high optical power from damage due to external sources of contamination.

BACKGROUND ART

This section is intended to provide a background or context to the embodiments disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

In the most basic form a laser has a final optical surface through which optical radiation (light) can pass and propagate in space beyond the laser. The final optical surface is susceptible to some damage when a power from the laser is absorbed by external contaminants that may adhere to the final optical surface. Localized heating of the contaminants often results in vaporization of coatings and substrate material of the final optic component. The final optic component may be a window, a laser output coupling mirror, a prism, a lens or the like. The final optic component may be an expensive component by itself, but more importantly this component can be required to protect an internal environment of the laser. When damage develops on the final optical surface, the power from the laser can drill a hole through the final optic surface starting from outside of the laser. If the final optic component is fully punctured, the entire laser resonator cavity may be damaged beyond repair.

SUMMARY

According to a first aspect, an apparatus, comprising: a housing comprising one or more optical components where at least one of the one or more optical components is a sacrificial component, wherein in a working state the housing has a predefined one or more gas pressures in corresponding one or more portions of the housing; and one or more transducers configured, when the housing is in the working state, to automatically generate a shutdown command of a laser when a gas pressure parameter at least in one of the one or more portions of the housing is changed beyond a threshold level which is detected by at least one pressure transducer of the one or more transducers and caused by an external contamination. Further, the housing may be attachable to the laser or may be a part of the laser.

According to a second aspect, a method, comprising: providing an apparatus having a housing comprising one or more optical components where at least one of the one or more optical components is a sacrificial component, and one or more transducers; providing predefined one or more gas pressures in corresponding one or more portions of the housing; and detecting using at least one pressure transducer of the one or more transducers when a gas pressure parameter at least in one of the one or more portions of the housing is changed beyond a threshold level which is caused by an external contamination to generate a shutdown command of the laser. Moreover, the method may further comprise of replacing the punctured at least one sacrificial optical component.

BRIEF DESCRIPTION OF THE DRAWINGS

For a better understanding of the nature and objects of the exemplary embodiments, reference is made to the following detailed description taken in conjunction with the following drawings, in which.

DETAILED DESCRIPTION

By way of introduction, U.S. Pat. No. 5,359,176 and U.S. Pat. No. 5,898,522, illustrate conventional solutions for protection of laser optics from damage due to contamination from sources external to the laser. Both patents require the use of a flowing gas to direct contamination away from the laser optics. However, the requirement for the flowing gas is not always practical for many laser applications, particularly for the case of small lasers. The use of the flowing gas may be avoided as disclosed in U.S. Pat. No. 4,439,862 by sealing the volume of the low pressure laser gas with optical Brewster windows. Here, the gas spaces between the optical Brewster windows and the laser mirrors are sealed to prevent external contamination from reaching the optical Brewster windows. When the output mirror of the laser fails due to an external contamination, the output mirror's associated optical Brewster window can also be damaged by debris that may be introduced by the fire that often forms on the inside surface of the optical window or mirror. However, the disclosure of the U.S. Pat. No. 4,439,862 does not provide any automatic remedy for turning off the laser which may result in ultimate destruction of the output mirror and/or the associated optical Brewster window and other internal parts of the laser.

The above issues may be resolved using embodiments described herein.

An apparatus and a method are presented for protecting lasers or other sources of high optical power from damage due to external sources of contamination using a concept of a sacrificial optical component and automatic laser shutdown based on a pressure indication of a substantial damage to the sacrificial optical component such as puncturing through that component. The laser may be any high intensity laser in the visible part of the optical spectrum (such as ion Ar laser), in the near infrared (such as Nd:YAG or semiconductor GaAs laser), in the far infrared (such as $CO_2$ laser) and the like. The protecting device/apparatus (see FIGS. 1-4) may comprise a housing containing one or more optical components where at least one of the one or more optical components is a sacrificial component, the housing being attachable to a laser to protect at least one output optical component of the laser (such as a window, a laser output coupling mirror, a lens, etc.), where in an attached working position the housing has a predefined one or more gas pressures in corresponding one or more portions of the housing.

Also the optical components of the protecting device/protecting module may comprise antireflection coating for an operating wavelength range of the laser to reduce reflection losses and possible interference and back reflection effects.

Figure 5:
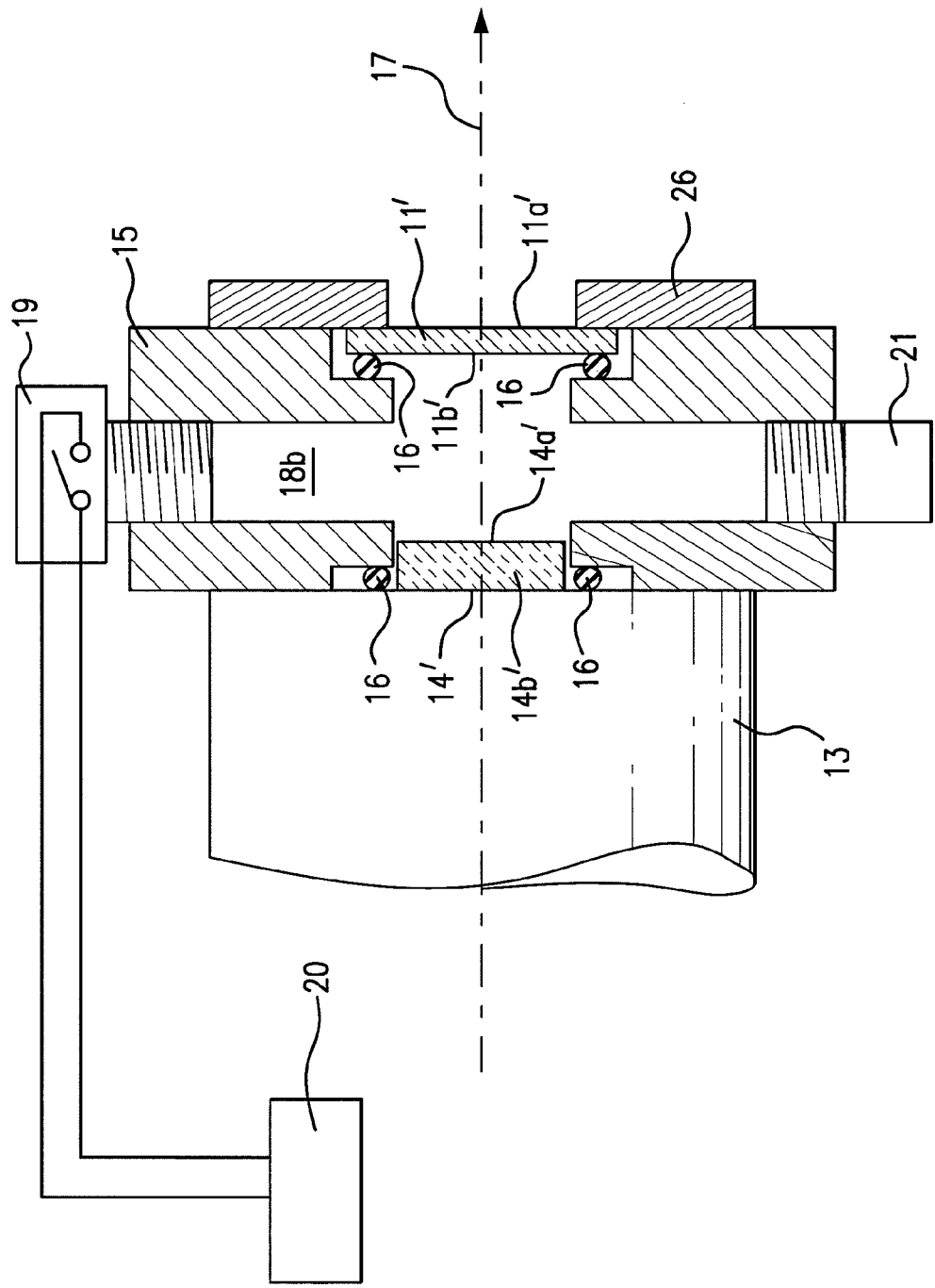
FIG. 5 is a diagram of a laser optic protection provided inside of the laser cavity with a possible wavelength selection capability according to further exemplary embodiments.

Moreover, the housing comprising the laser optic protection components described herein may be implemented as a module inside of the laser cavity as further discussed in reference to FIG. 5.

Further, the protecting device/laser/apparatus may comprise one or more transducers (such as pressure transducers) configured, when the housing is in the attached working position (or inside of the laser cavity), to automatically generate a shutdown command of the laser when a gas pressure parameter at least in one of the one or more portions of the housing is changed beyond a threshold level which is detected by at least one pressure transducer of the one or more transducers and caused by external contamination.

The exemplary embodiments described herein are intended to prevent the destruction of a laser by utilizing a less costly, sacrificial optic component to isolate the final optic component of the laser and/or laser cavity from the damage due to the external contamination. An example of a less costly optic component can be an optic component fabricated using ZnS as opposed to the more expensive materials such as ZnSe, Ge or CdTe which may be used for the more demanding final optic component. The object of the described embodiments is to detect a damage on the sacrificial optic component (s) as the damage forms and to automatically shut down the laser before the damage to the output mirror/window of the laser or to the laser resonator cavity can occur. When the damage to the sacrificial optic component occurs, a fire can usually start on the outside surface 11a of the sacrificial optic component 11 where contamination is present (the reference numbers are applicable to FIGS. 1-5 discussed below in detail). Often a fire can also form on the inside surface 11b of the sacrificial optic component 11 as well. The objective then is to detect this damage to the sacrificial optic component 11 utilizing a pressure transducer 19 to detect a pressure change when the sacrificial optic component 11 is punctured. Another object is to direct debris away from the final optic component 12 of the laser 13 or any optic component between the final optic 12 and the sacrificial optic component 11 as shown in FIGS. 1-4. Similar effects can be implemented inside of the laser cavity to protect the laser resonator cavity as discussed in reference to FIG. 5 below. A further object is to utilize the electrical signal (a shutdown command) from the pressure transducer 19 (implemented as a pressure actuated switch, a pressure sensor or the like) to shut down the laser power supply 20 and prevent damage to the laser. Alternatively, the shutdown command may cause termination of a lasing capability of the laser without shutting down a power supply of the laser (e.g., by closing a shutter inside the laser cavity).

The damage to the sacrificial optic component 11 (or 11') may be also detected by a variety of other types of transducers including UV (ultraviolet) photodiodes, ionic smoke detectors, optical smoke detectors, microphones, infrared detectors to name a few. These types of transducers may be used in addition to a pressure transducer. In all cases the use of a pressure differential across the sacrificial optic component 11 (in FIG. 1-4) or 11' (in FIG. 5) is beneficial in directing debris away from the final optic component 12 of the laser 13 or any optic component between the final optic component 12 and the sacrificial optic component 11 as shown in FIGS. 1-4, or away from the laser resonator cavity as shown in FIG. 5.

FIGS. 1-4 demonstrate four exemplary embodiments for implementing a laser protective device (apparatus) 10 and FIG. 5 demonstrates a laser with a build-in cavity protection with a possible wavelength selectivity, according to further exemplary embodiments.

Figure 1:
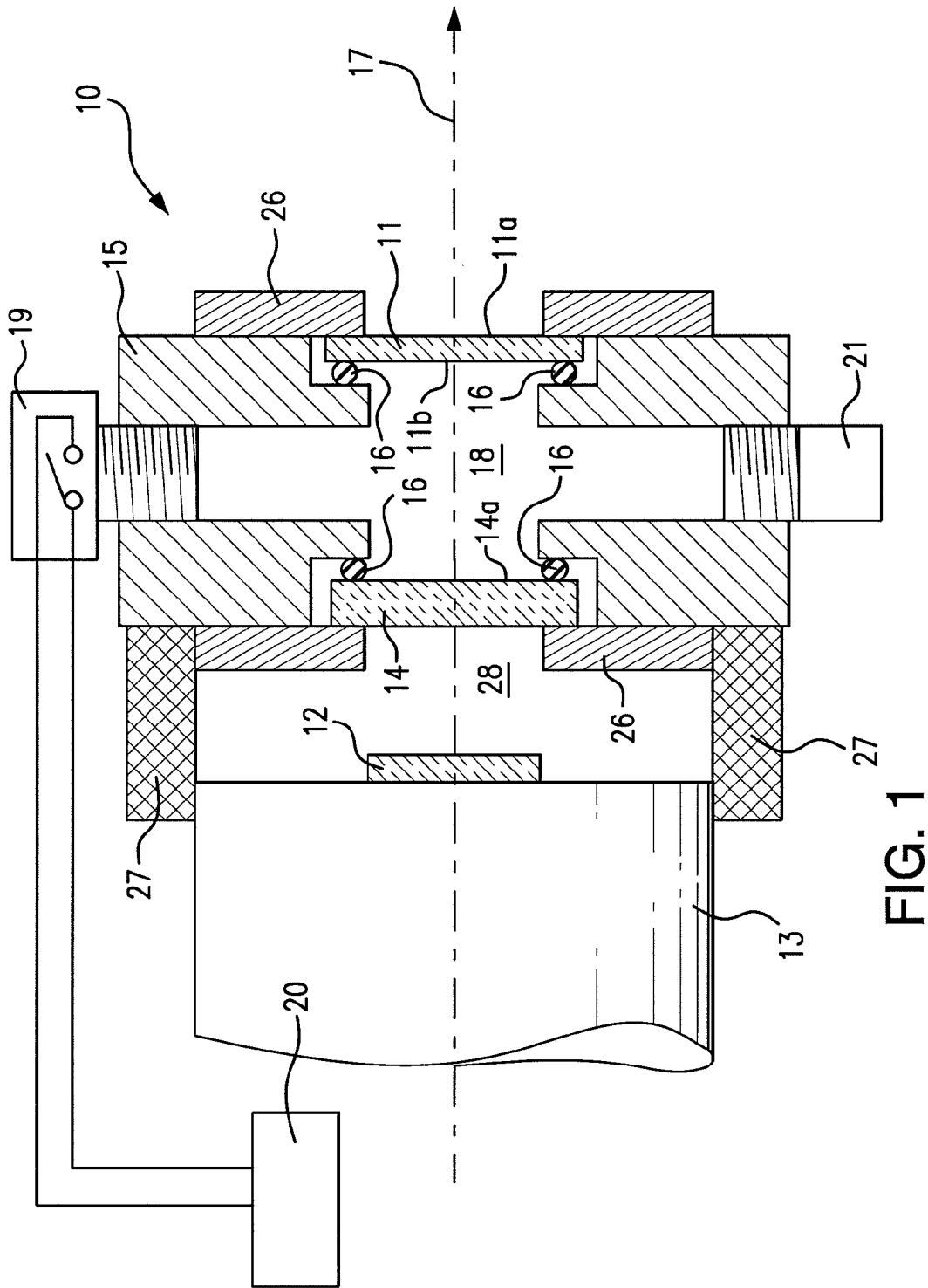
FIG. 1 is a diagram of a laser protective device according to a first exemplary embodiment.

According to a first embodiment shown in FIG. 1, the sacrificial optic component 11 may be an optical window where a second optical window 14 may be used. For the case of the first embodiment both optical windows may have antireflection coatings on all surfaces. Both optical windows are mounted on a housing 15 by a means that allows a gas tight (such as hermetic) seal to be formed. The gas tight seal may be formed by O-ring seals 16 compressed by clamp rings 26 as shown in FIG. 1 (as well as in other FIGS. 2-5), or by other means such as, but not limited to, metal seals or thermoset seals to maintain a reliable seal over the lifetime of the laser 13. The housing 15, the sacrificial optic component 11 and the second optical window 14 form part of an assembly having an optic axis 17 that is substantially co-aligned with the optical axis of the laser 13. It is noted that the protective optic components 11 and 14 may be optionally slightly misaligned by about 2°-5° to prevent undesirable back reflections into the laser resonator cavity (this measure may be implemented in addition to or instead of having antireflection coatings on the protective optic components 11 and 14. Moreover, this feature may be also applicable to other embodiments demonstrated in FIGS. 2-5. Therefore the term "substantially co-aligned" has a broad interpretation as described herein, i.e., as being aligned within at least 5° or less.

A space 18 inside the housing 15, between the optical windows 11 and 14 can be pressurized significantly above atmospheric pressure with a gas such as air or dry nitrogen. The pressure in the space 18 may be typically in the range of 30 to 50 psi (14 psi being an atmospheric pressure). A transducer (or a pressure transducer) 19 in the form of a pressure actuated switch or a pressure sensor is also mounted on the housing 15 to sense a loss of pressure in the space 18 between the windows 11 and 14. In the event that the sacrificial optic component 11 is punctured, the pressurized gas in the space 18 will help to protect the second optical window 14 by flowing out of the space 18, via the hole punctured in the sacrificial optic component 11. Any debris will be blown along the optical axis 17, away from second optical window 14. As the pressure of the gas in the space 18 drops below a predefined threshold level, an electrical signal from the transducer 19 will cause the laser power supply 20 of the laser 13 to shut down so that the further optical damage will be averted. However in many cases a fire may form on the inside surface 11b of the sacrificial optic component 11 before it is burned through. In such cases a damage may also form on the inside surface 14a of the second optical window 14. Therefore, it is advantageous to make the thickness of sacrificial optic component 11 significantly smaller than the thickness of the second optical window 14 to assure that the sacrificial optic component 11 burns through before the second optical window 14. After the sacrificial optic component 11 is replaced, the space 18 may be re-pressurized by using a filling mechanism 21. The filling mechanism 21 can be as simple as a check valve. Also, a dust seal 27 can be required, as shown in FIG. 1, to keep external contamination from entering a space 28 and reaching the final optic component 12 of the laser 13. The dust seal 27 may be a foam gasket and not necessarily hermetically seal space 28 which can be typically at the atmospheric pressure.

Figure 2:
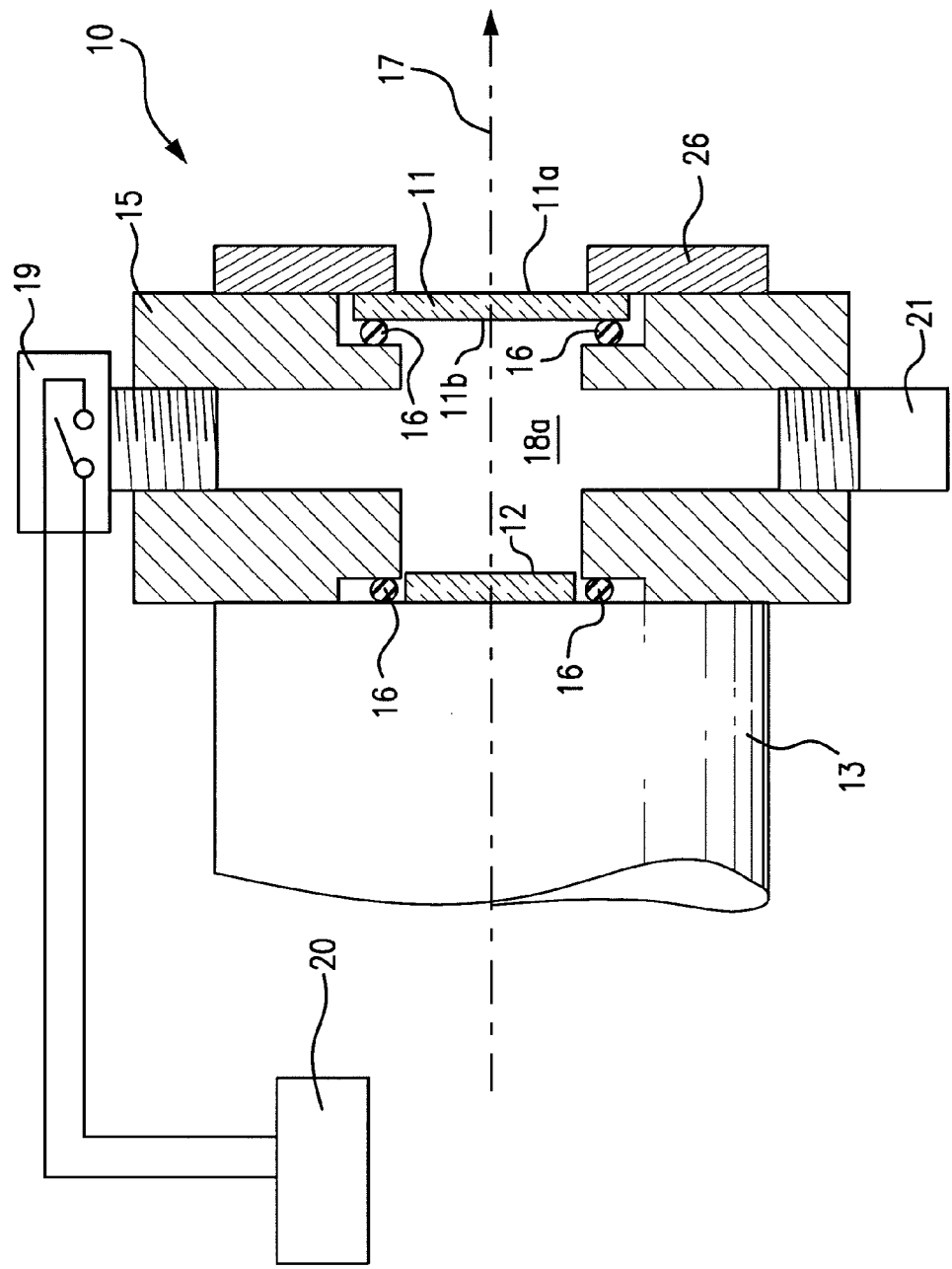
FIG. 2 is a diagram of a laser protective device according to second exemplary embodiment.

For a second embodiment of the invention illustrated in FIG. 2, the second optical window 14 is not used Eliminating the second optical window 14 reduces cost and eliminates a possible source of unwanted reflected light inside the laser. In this case the sacrificial optic component 11 may have antireflection coatings on the outside surface 11a and inside surface 11b. Then for this second embodiment, the housing 15 may be mounted directly on the body of the laser 13, utilizing a gas tight (hermetical) seal. The space 18a between the sacrificial optic component 11 and the final optic component 12 of the laser 13 is pressurized significantly above the atmospheric pressure with a gas such as air or dry nitrogen. The pressure in the space 18a may be typically in the range of 30 to 50 psi. In the event that the sacrificial optic component 11 is punctured, the pressurized gas in the space 18a will protect the final optic component 12 by forcing debris to be blown away from the final optic component 12. As in the case of the first embodiment, a drop in pressure of the gas in the space 18a will cause the transducer (pressure transducer) 19 to generate an electrical signal that will cause the power supply 20 of the laser 13 to shut down and the further optical damage will be averted. For the case of the second embodiment, the dust seal 27 is not required since the laser optic protection device 10 is mounted and sealed on the laser 13.

Figure 3:
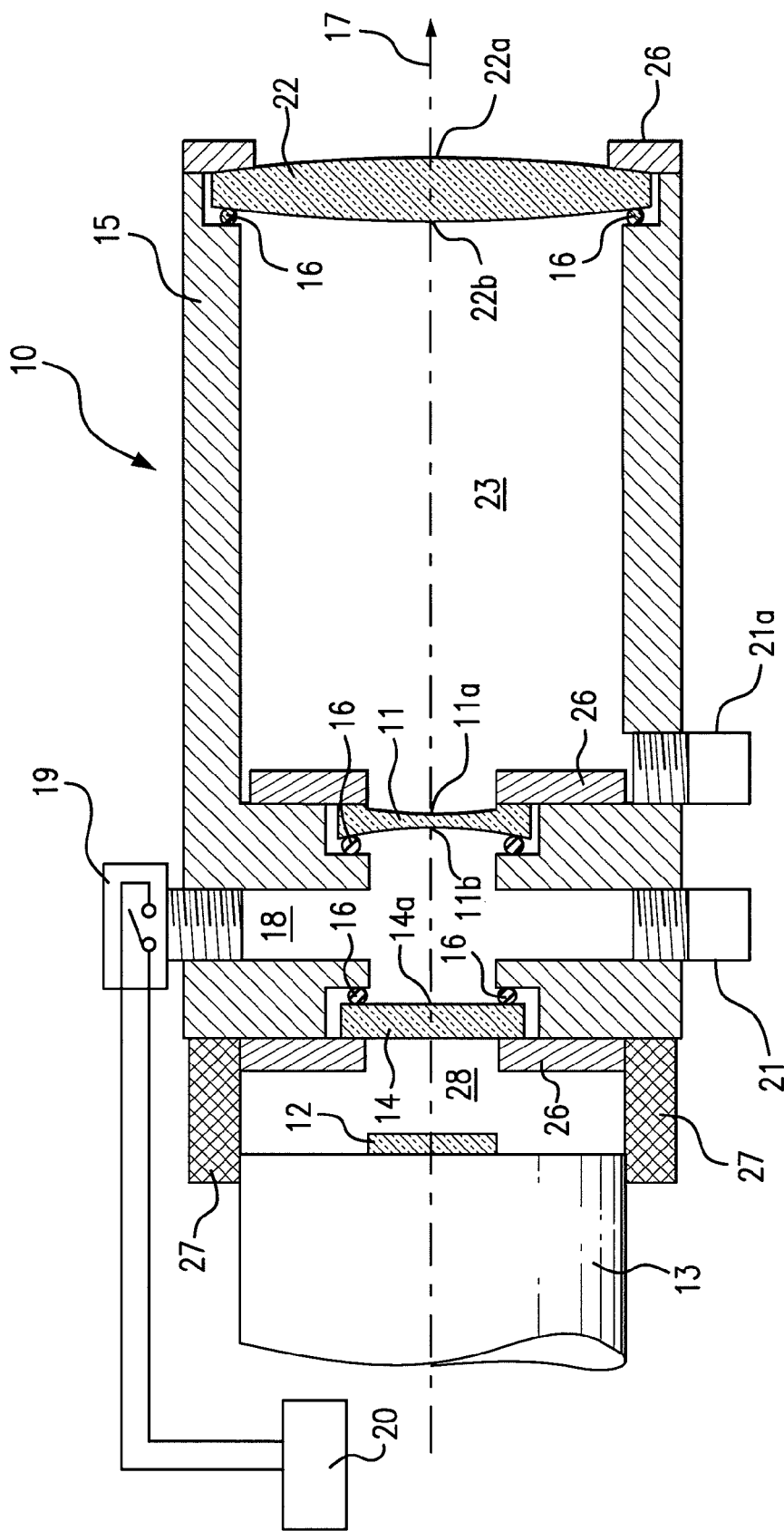
FIG. 3 is a diagram of a laser protective device according to a third exemplary embodiment.

FIG. 3 illustrates a third embodiment where the sacrificial optic component 11 is the diverging lens of a Galilean beam expanding telescope. Sacrificial optic component 11 could be a converging lens of a Keplerian telescope as well. However the Galilean telescope may be advantageous because a diverging lens would be thinner than a converging lens at the optical axis 17 relative to the thickness of the second optical window 14. In either case the telescope may have an objective lens 22 that will be thicker and will be subjected to a much lower optical intensity (power density) than the sacrificial optic component 11. The external contamination deposited on the outer surface 22a of the objective lens 22 may lead to a fire forming on the inside surface 22b of the objective lens 22. Smoke and debris from the fire at the inside surface 22b of the objective lens 22 may be deposited on the outside surface 11a of the sacrificial optic component 11 where the optical intensity can be very high. By necessity of the telescope design the thickness of the objective lens 22 should be greater than of the sacrificial optic component 11 so that the sacrificial optic component 11 will most likely puncture first. As in the case of the previously described embodiments of the invention, the space 18 is pressurized and when the sacrificial optic component 11 is punctured, the drop in pressure will be detected by the pressure transducer 19 which will in turn shutdown the power supply 20 of the laser 13. However, unlike the previously described embodiments, the third embodiment provides for an additional space 23 in the housing 15. The space 23 generally can have a much larger volume than the space 18 and be at a lower pressure than the space 18. The pressure of the gas in space 23 can range from the atmospheric pressure down to a vacuum (a few mTorr). When the sacrificial optic component 11 is punctured, the debris will be blown into the space 23 and away from the second optical window 14. By remaining intact the second optical window 14 can protect the final optic component 12 of laser 13. After the sacrificial optic component 11 is replaced, the space 18 may be re-pressurized by using a filling mechanism 21. In addition, a second filling mechanism 21a may be utilized to allow the gas pressure in space 23 to be pumped down to a lower value than the pressure in the space 18. For the case of the fourth embodiment, a dust seal 27 is required to keep the external contamination from reaching the final optic component 12 of the laser 13.

Figure 4:
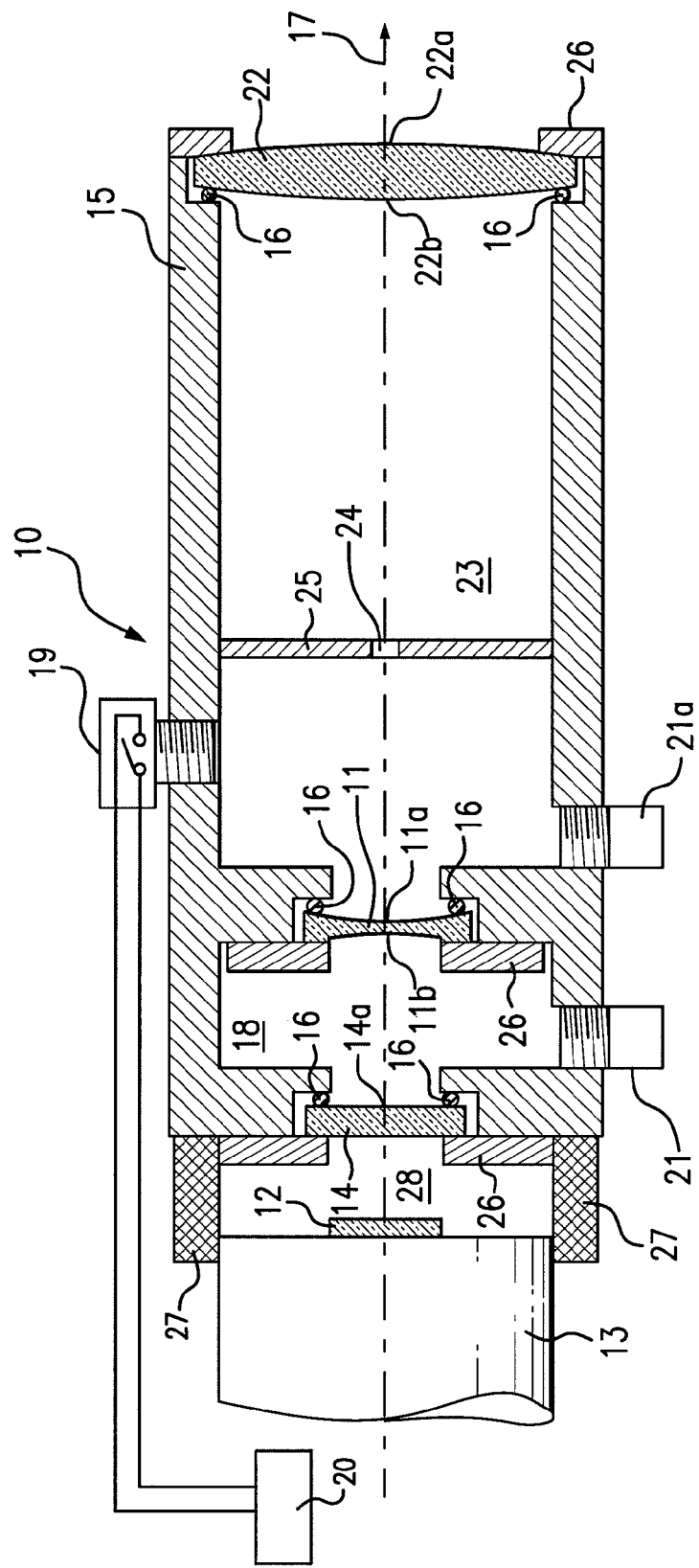
FIG. 4 is a diagram of a laser protective device according to a fourth exemplary embodiment.

FIG. 4 illustrates a fourth embodiment where the sacrificial optic component 11 is the converging lens of a Keplerian beam expanding telescope. For the case of the Keplerian beam expanding telescope the laser beam can focus to a small diameter at a focal point 24. Then it may be advantageous to place a diaphragm 25 with a small aperture hole at the focal point 24 to slow the transfer of smoke and debris to the sacrificial optic component 11. On the other hand, the small aperture hole can be made large enough to allow the laser beam to pass through the diaphragm 25 and yet small enough to delay the transfer of smoke and debris to the sacrificial optic component 11 in the event a fire develops on the inside surface 22b of objective lens 22. Despite the fact that the objective lens 22 is thicker than the sacrificial optic component 11, the presence of the diaphragm 25 may allow the objective lens 22 to puncture before the sacrificial optic component 11. As in the case of the third embodiment, the space 18 is pressurized. The space 23 however, is pumped down below the atmospheric pressure so that puncturing the objective lens 22 or the sacrificial optic component 11 will cause pressure the transducer 19 to sense a rise in the pressure, relative to the atmospheric pressure, of the gas in space 23. The signal from the pressure transducer 19 may be then utilized to shut down the power supply 20 of laser 13 and prevent damage to the final optic component 12 of the laser 13. For the fourth embodiment, the dust seal 27 is required to keep the external contamination from reaching the final optic 12 of the laser 13.

Further embodiments illustrated in FIG. 5 can provide laser optic protection of a laser resonator cavity of the laser 13 with a possible wavelength selection capability without a need for expensive diffraction gratings or mirrors with special coatings. In FIG. 5 the laser optic protection is built within the laser cavity of the laser 13, where the sacrificial optic component 11' has a similar functionality as the final optic component 12 in FIGS. 1-4.

The sacrificial optic component 11' (mirror/window) may have a partially reflective coating on a surface 11b' (like an output laser cavity mirror) and an antireflection coating on a surface 11a'. In addition, a second optical window 14' (which can be similar to the optical window 14 shown in FIGS. 1, 3 and 4) may have anti-reflection coatings on an outside surface 14a and on an inside surface 14b. The second optical window 14' can protect the internal environment of the laser 13 as would otherwise be the case for the final optic component 12 of the laser 13 as shown in FIGS. 1-4. Furthermore, the space 18b between the sacrificial optic component 11' and the second optical window 14' may be pressurized significantly above the atmospheric pressure with a special mixture of gases selected to have strong optical absorption at all optical wavelengths except for the wavelength(s) at which laser optical output power is desired. The pressure in space 18b may be typically in the range of 30 to 50 psi. As an example, sulfur hexafluoride gas has a very strong absorption at 10.6 microns, which is the wavelength at which a $CO_2$ laser would normally operate.

However, the $CO_2$ laser can also operate at 9.6 microns, a wavelength at which sulfur hexafluoride has almost no absorption. Thus, introduction of sulfur hexafluoride into space 18b will suppress laser operation at 10.6 microns and the laser will shift to 9.6 microns, the next most powerful wavelength for the $CO_2$ laser. However, if the external contamination may cause sacrificial optic component 11' to fail, the pressure transducer 19 will cause the power supply 20 of the laser 13 to shut down and further optical damage will be averted. For the case of the embodiment demonstrated in FIG. 5, the dust seal 27 is not required since the laser optic protection module is mounted and sealed as a part of the laser 13. It is further noted that the embodiment illustrated in FIG. 5 can be used with or without a spectral/wavelength selection depending on the pressurized gas used as explained herein.

Furthermore, other examples shown in FIGS. 1-4 can be used with gases having spectral/wavelength selectivity as demonstrated in FIG. 5 but used in examples of FIGS. 1-4 as simple spectral filters outside of the laser cavity. For all aforementioned embodiments (shown in FIGS. 1-5), the single pressure transducer 19 may be used to sense the gauge pressure of the space 18, 18b or 23. However, more than one pressure transducer can be utilized to sense pressure in spaces 18, 18b and 23. In addition, the transducer 19 and/or any additional transducers could be absolute pressure transducers or a differential pressure transducer mechanically configured to sense a change in the pressure difference between the space 18 and the space 23 (for example, as shown in FIGS. 3 and 4).

Figure 6:
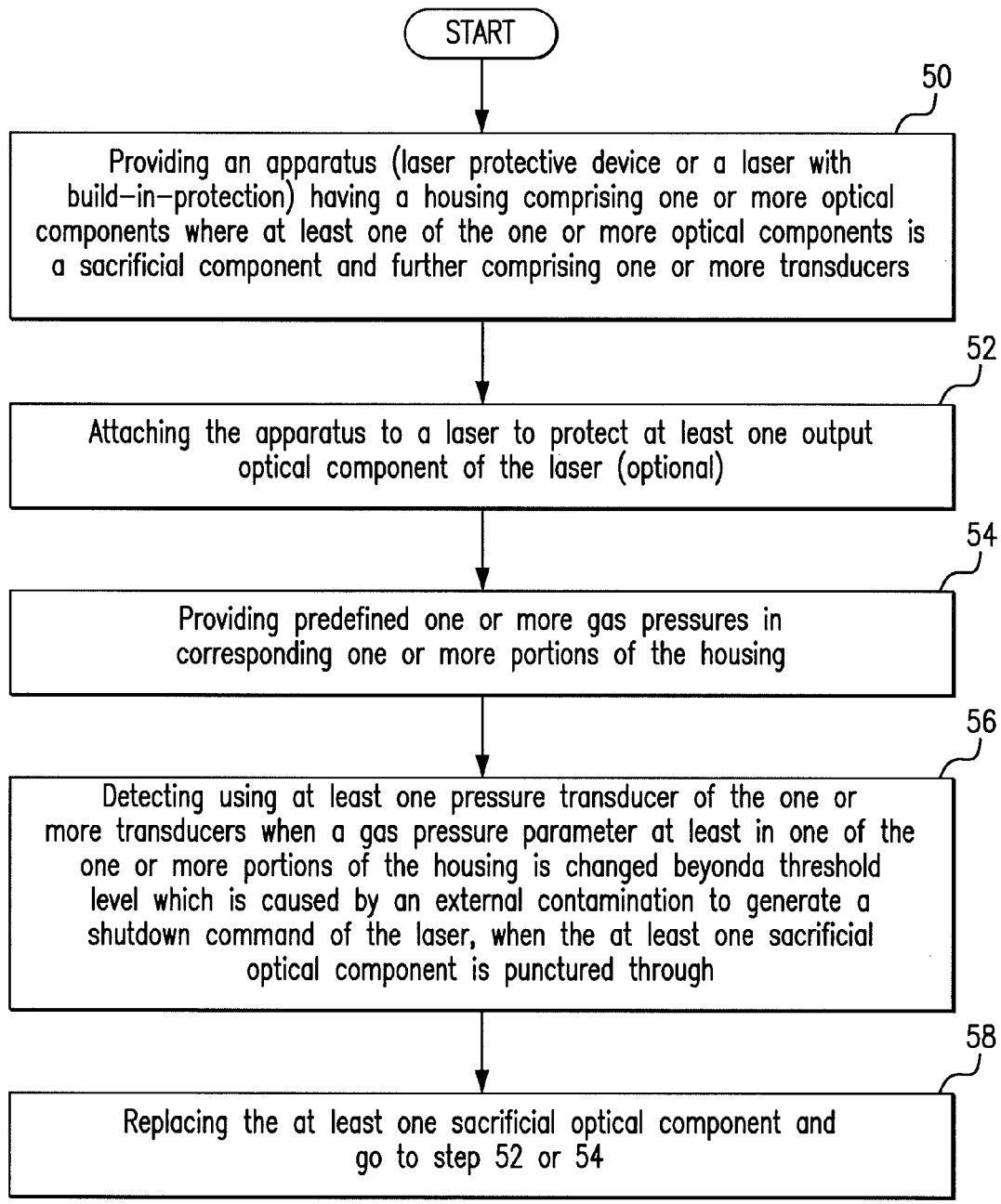
FIG. 6 is a flow chart demonstrating implementation of exemplary embodiments described herein.

FIG. 6 shows an example of a flow chart demonstrating implementation of exemplary embodiments of the invention. It is noted that the order of steps shown in FIG. 6 is not absolutely required, so in principle, the various steps may be performed out of the illustrated order. Also certain steps may be skipped or selected steps or groups of steps may be performed in a separate application.

In a method according to this exemplary embodiment, as shown in FIG. 6, in a first step 50, an apparatus (laser protective device or a laser with a build-in protection) is provided, the apparatus having a housing comprising one or more optical components where at least one of the one or more optical components is a sacrificial component, and further comprising one or more transducers (see examples in FIGS. 1-5).

In a next step 52, the apparatus is attached to a laser to protect at least one output optical component of the laser (see examples in FIGS. 1-4). This step is optional to be performed only for examples shown in FIGS. 1-4.

In a next step 54, one or more gas pressures in corresponding one or more portions of the housing are provided as demonstrated in examples of FIGS. 1-5.

In a next step 56, at least one pressure transducer of the one or more transducers detects when a gas pressure parameter at least in one of the one or more portions of the housing is changed beyond a threshold level which is caused by an external contamination to generate a shutdown command of the laser, e.g., when the at least one sacrificial optical component is punctured through, as demonstrated in examples of FIGS. 1-5.

In a next step 58, the damaged sacrificial optical component is replaced and the process goes back to step 52 or 54.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. An apparatus, comprising:
a housing comprising one or more optical components where at least one of the one or more optical components is a sacrificial component, wherein in a working state the housing has a predefined one or more gas pressures in corresponding one or more portions of the housing; and
one or more transducers configured, when the housing is in the working state, to automatically generate a shutdown command of a laser when a gas pressure parameter at least in one of the one or more portions of the housing is changed beyond a threshold level which is detected by at least one pressure transducer of the one or more transducers and caused by an external contamination.

2. The apparatus of claim 1, wherein the shutdown command is generated when the at least one sacrificial optical component is punctured through.

3. The apparatus of claim 1, further comprising:
one or more filling mechanisms configured to provide predefined one or more gas pressures in the corresponding one or more portions of the housing.

4. The apparatus of claim 1, wherein, when the housing is in the attached working position, at least one of the predefined one or more gas pressures is above of an atmospheric pressure, wherein a pressure outside of the housing is the atmospheric pressure.

5. The apparatus of claim 1, wherein, when the housing is in the working state, at least one of the predefined one or more gas pressures is below the atmospheric pressure.

6. The apparatus of claim 1, wherein one or more optical components comprises antireflection coating for an operating wavelength range of the laser.

7. The apparatus of claim 1, wherein the predefined one of the one or more gas pressures are provided using an air or a dry nitrogen.

8. The apparatus of claim 1, wherein the laser is a $CO_2$ laser.

9. The apparatus of claim 1, wherein the shutdown command of the laser causes a shutdown of a power supply of the laser.

10. The apparatus of claim 1, wherein the shutdown command of the laser causes termination of a lasing capability of the laser without shutting down a power supply of the laser.

11. The apparatus of claim 1, wherein one of the one or more transducers is an ultraviolet photodiode, an ionic smoke detector, an optical smoke detector, a microphone or an infrared detector, so that the one of the one or more transducers is used complimentary to the at least one pressure transducer.

12. The apparatus of claim 1, wherein the housing is attached to the laser using a dust seal.

13. The apparatus of claim 12, wherein the housing is attachable to the laser to protect at least one output optical component of the laser, and in the attached working state the housing comprises only one portion, said one portion being pressurized above an atmospheric pressure, and the one or more optical components comprising two hermetically connected optical windows substantially co-aligned with an axis of the at least one output optical component of the laser, so that the shutdown command is generated when one of the two optical windows acting as the at least one sacrificial component is punctured through, causing a reduction of the pressure in the one portion of the housing.

14. The apparatus of claim 13, wherein a first of the two optical windows located further than a second of the two optical windows from the at least one output optical component of the laser is thinner than the second of the two optical windows, so that the first of the two optical windows is punctured first causing generation of the shutdown command.

15. The apparatus of claim 1, wherein the housing is attachable to the laser to protect at least one output optical component of the laser, and in the attached working state the housing comprises only one portion, said one portion being pressurized above an atmospheric pressure, said one portion having the one or more optical components comprising an optical window hermetically connected to the housing and one opening opposite to the optical window both substantially co-aligned with an axis of the at least one output optical component of the laser, said opening being hermetically connected to the at least one output optical component of the laser, so that the shutdown command is generated when the optical window acting as the at least one sacrificial component is punctured through, causing a reduction of pressure in the one portion of the housing.

16. The apparatus of claim 15, wherein the optical window is thinner than the at least one output optical component of the laser.

17. The apparatus of claim 1, wherein the housing comprises only one portion which is a part of the laser, said one portion being pressurized above an atmospheric pressure in the working state, said one portion having at least two optical components comprising an output optical component of the laser and an optical window both hermetically connected to the housing and substantially co-aligned with an axis of the output optical component of the laser, so that the shutdown command is generated when the output optical component of the laser is punctured through, causing a reduction of pressure in the one portion of the housing.

18. The apparatus of claim 17, wherein a gas in the one portion of the housing for pressurizing above the atmospheric pressure is also used for a wavelength selection of a laser output beam.

19. The apparatus of claim 18, wherein the gas selecting a wavelength of 9.6 microns and suppressing a wavelength of 10.6 microns of the laser output beam for a $CO_2$ laser is a sulfur hexafluoride.

20. The apparatus of claim 1, wherein the housing is attached to the laser using a dust seal, and in the attached working state the housing comprises:
 a first portion, pressurized above an atmospheric pressure and comprising an optical window and a first lens both hermetically connected with the housing and substantially co-aligned with an axis of the at least one output optical component of the laser, and
 a second portion located further from the laser, pressurized below atmospheric pressure and comprising the first lens shared with the first portion and a second lens hermetically connected with the housing and substantially co-aligned with an axis of the at least one output optical component of the laser,
 so that the shutdown command is generated when the first lens acting as the sacrificial component is punctured through causing a change of pressure in the first and second portions of the housing.

21. The apparatus of claim 20, wherein the first lens is a diverging lens and the second lens is an objective lens, both forming a Galilean beam expanding telescope.

22. The apparatus of claim 20, wherein the first lens is a converging lens and the second lens is an objective lens, both forming a Keplerian beam expanding telescope, and where a diaphragm with a small aperture hole at a focal point of the Keplerian beam expanding telescope to protect the first lens acting as the sacrificial component from possible debris and smoke.

23. A method, comprising:
 providing an apparatus having a housing comprising one or more optical components where at least one of the one or more optical components is a sacrificial component, and one or more transducers;
 providing predefined one or more gas pressures in corresponding one or more portions of the housing; and
 detecting using at least one pressure transducer of the one or more transducers when a gas pressure parameter at least in one of the one or more portions of the housing is changed beyond a threshold level which is caused by an external contamination to generate a shutdown command of the laser.

24. The method of claim 23, wherein the shutdown command is generated when the at least one sacrificial optical component is punctured through.

25. The method of claim 24, further comprising:
 replacing the punctured at least one sacrificial optical component.

26. The method of claim 22, wherein the housing is a part of the laser.

27. The method of claim 22, wherein before providing predefined one or more gas pressures, the method comprises:
 attaching the housing to a laser to protect at least one output optical component of the laser.

* * * * *